(12) United States Patent
Jang et al.

(10) Patent No.: US 9,056,781 B2
(45) Date of Patent: *Jun. 16, 2015

(54) METHOD OF PRODUCING CALCITE CAPABLE OF CONTROLLING A GRAIN SIZE THEREOF

(75) Inventors: Young Nam Jang, Daejeon (KR); Kyoung Won Ryu, Daejeon (KR); Myung Gyu Lee, Daejeon (KR); Seung Woo Lee, Daejeon (KR); Kyung Sun Song, Daejeon (KR); Jun Hwan Bang, Daejeon (KR); Soo Chun Chae, Seoul (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 224 days.

This patent is subject to a terminal disclaimer.

(21) Appl. No.: 13/450,058

(22) Filed: Apr. 18, 2012

(65) Prior Publication Data
US 2012/0269714 A1 Oct. 25, 2012

(30) Foreign Application Priority Data
Apr. 20, 2011 (KR) ........................ 10-2011-0036630

(51) Int. Cl.
*C01F 11/18* (2006.01)

(52) U.S. Cl.
CPC ........... *C01F 11/181* (2013.01); *C01P 2004/41* (2013.01); *C01P 2004/39* (2013.01); *C01P 2004/40* (2013.01); *C01P 2004/38* (2013.01); *C01P 2002/72* (2013.01); *C01P 2002/77* (2013.01); *C01P 2002/88* (2013.01); *C01P 2004/03* (2013.01); *C01P 2004/30* (2013.01); *C01P 2004/61* (2013.01); *C01P 2004/62* (2013.01)

(58) Field of Classification Search
CPC ............... C01F 11/181; C01P 2004/38; C01P 2004/39; C01P 2004/40; C01P 2004/41
USPC ........................................................ 423/431
See application file for complete search history.

(56) References Cited

U.S. PATENT DOCUMENTS 8,470,281 B2 * 6/2013 Bang et al. .................... 423/431
2010/0258506 A1 * 10/2010 Berkowitz et al. ............ 210/713

* cited by examiner

*Primary Examiner* — Stuart Hendrickson
(74) *Attorney, Agent, or Firm* — The Webb Law Firm

(57) ABSTRACT

Provided is a method of synthesizing high-purity calcite capable of controlling a grain size thereof, by reacting an aqueous calcium chloride solution with $CO_2$ gas under strong alkaline condition, to crystallize into white and ultra-fine grain calcite. The method of synthesizing fine-grain calcite according to the present disclosure can decrease super-saturation by producing calcite under the strong alkaline conditions, thereby suppressing generation and growth of grain, resulting in controlling the grain size. Therefore, the above method is useful in producing high-purity ultra-fine grain calcite and can control the grain size of calcite from several hundreds of nanometers to several tens of nanometers by regulating the concentration of an aqueous caustic soda solution.

4 Claims, 4 Drawing Sheets

METHOD OF PRODUCING CALCITE CAPABLE OF CONTROLLING A GRAIN SIZE THEREOF

CROSS-REFERENCE TO RELATED APPLICATIONS

This application claims priority under 35 U.S.C. §119 to Korean Patent Application No. 10-2011-0036630, filed on Apr. 20, 2011, in the Korean Intellectual Property Office, the disclosure of which is incorporated herein by reference in its entirety.

TECHNICAL FIELD

The following disclosure relates to a method of producing calcite by using an aqueous caustic soda solution and an aqueous calcium chloride solution, and more particularly, a method for controlling a grain size of crystallized calcite to a nano-size level by adjusting a concentration of the aqueous caustic soda solution.

BACKGROUND

Calcite is a compound having a chemical formula of $CaCO_3$, and exhibits multiform characteristics that are classified into three different minerals, that is, calcite, aragonite, and vaterite. However, in fact, calcite is widely and industrially used, and it has various shapes, such as, a spindle shape, a cubic form, a spherical form, and the like, depending on the synthesis method thereof. In addition, as the grain size becomes smaller and the whiteness is further increased, calcite is a material utilized more often for various functions, which increases product costs.

Calcite is generally referred to as calcium carbonate in the industrial field, and is sorted into heavy calcium carbonate and hard calcium carbonate. The heavy calcium carbonate is natural calcite, and also called stone powder. It is prepared by pulverizing limestone or crystalline calcite into several sizes using a pulverizer, and utilized as a general-purpose material such as fuel-gas desulfurization or the like. Meanwhile, in general, the hard calcium carbonate is chemically prepared by subjecting limestone to firing, hydrating, and synthesizing processes. It is very widely utilized in various industries since the quality of products is relatively easy to improve and the shape of the grain is controllable in accordance with usage thereof. In addition, calcium carbonate for food and drug is subjected to procedures of crystalline form treatment and surface treatment, impurity control, and the like, to control functions thereof in accordance with respective food and drug products, and quality requirement levels thereof are higher and higher-purity products are required as compared with general traditional products. For example, whiteness thereof is 96 to 97, which is at a high level, and an average grain size thereof has about several microns, which is minute. In addition, a restriction value on several heavy metals, particularly arsenic, is several ppm, which is very strict. This is currently used as an additive in foods, cosmetics, toothpaste, drugs, and the like.

Methods of synthesizing calcite in a large amount are classified into a carbon dioxide combination method, a lime soda method, a soda method, and the like. According to the carbon dioxide combination method, a limestone source is used or calcium hydroxide which is a reagent is used to prepare lime milk, and $CO_2$ gas is blown thereinto (Equation 1). According to the lime soda method, lime milk or calcium hydroxide is reacted with sodium carbonate to prepare caustic soda, and here, calcite is yielded as a by-product (Equation 2). Meanwhile, according to the soda method, calcium chloride and sodium carbonate are reacted with each other to synthesize calcite (Equation 3). However, since the lime soda method and the soda method employ sodium carbonate and ammonium chloride, which are soluble salts, sufficient washing needs to be performed when calcium carbonate is collected, and grain sizes and grain shapes are difficult to control. Hence, in recent, they are never used.

Contrary to these, since the carbon dioxide combination method is relatively simple and leads to high purity, calcium carbonate is synthesized by this method, recently. This method has been known to easily control the grain shape thereof but not the grain size. Since, in particular, a growth rate of calcite is controlled by suppressing a dissolution rate of nucleus generated during a reaction procedure and diffusion of ions, a method of producing calcite for food, cosmetics, toothpaste, and drugs has recently been used by using a solvent, such as, ethanol, methanol, or the like, which has lower solubility and a lower dielectric constant than water.

The respective methods for synthesis are expressed as follows:

$$Ca(OH)_2 + CO_2 = CaCO_3 + H_2O \quad \text{(Equation 1)}$$

$$Ca(OH)_2 + Na_2CO_3 = CaCO_3 + 2NaOH \quad \text{(Equation 2)}$$

$$CaCl_2 + Na_2CO_3 = CaCO_3 + 2NaCl \quad \text{(Equation 3)}$$

SUMMARY

As described above, in the prior art, limestone or calcite is a very important resource since it can be variously utilized in many industrial applications and consumption thereof is very large. In domestic, however, there are no deposits of high-purity calcite, which is a basic material, such that fine grains need to be synthesized. However, fine grain synthesis technologies therefor have not been developed. Therefore, in domestic, a natural resource of calcite is entirely dependent on importing from other countries in order to produce high value products. As the grain size of calcite becomes smaller and whiteness thereof becomes higher, calcite is more expensive and is further utilized as a high-function material.

Therefore, an embodiment of the present invention is directed to providing, firstly, a method of producing high-purity and high-whiteness calcite to increase added value thereof and diversify usage thereof, and, ultimately, a method of synthesizing fine-grain calcite. More specifically, an embodiment of the present invention is directed to providing a method for controlling a grain size of calcite from several micrometers to several tens of nanometers.

In one general, a method of synthesizing calcite is capable of controlling a grain size of calcite, so as to prepare calcite having a sub-micron grain size from several hundreds of nanometers to several tens of nanometers, by using an aqueous calcium chloride solution as a material source and changing the concentration of an aqueous caustic soda solution while $CO_2$ gas is flown thereinto, under room temperature and room pressure, thereby crystallizing into calcite.

In the present invention, firstly, appropriate concentrations of an aqueous caustic soda solution and an aqueous calcium chloride solution are prepared. Purity of a solid reagent used herein is determined in consideration of target purity of the final product. As purity of the reagent becomes higher, whiteness of the calcite becomes higher but costs thereof correspondingly increase. The caustic soda solution is inputted into a reactor, and a thermometer and a pH meter are installed at the reactor. Also, a gas flow meter is installed at the reactor in order to flow $CO_2$ gas thereinto at a constant rate.

When preparation is completed as above, an aqueous calcium chloride solution is slowly inputted to the aqueous caustic soda solution. When the two solutions are well mixed by stirring and at the same time, $CO_2$ gas is flown into the mixed solution, calcite crystals are formed. That is to say, there is provided a method of collecting calcite.

According to the present invention, a method for controlling a grain size of calcite is described as follows. In the cases where the concentration of the aqueous caustic soda solution, which is a solvent, is increased to 1.7N, 2.5N, 3.5N, 5N, 7N, or the like, during the above reaction procedure, a difference in super-saturation of calcium hydroxide may occur, resulting in differences in a dissolving rate and a diffusing rate of calcium hydroxide. Therefore, a grain size of calcite can be reduction-controlled by regulating a crystal growth rate in proportion to the concentration of the aqueous caustic soda solution. At the same time, if the purity of the starting source materials is adjusted, purity and whiteness are largely increased. As such, purity and whiteness are controlled in addition to the grain size, thereby creating a more added value.

Hereinafter, the present invention will be described in detail with reference to FIG. 1.

The present invention may provide a method of synthesizing calcite, including: a) preparing source materials by preparing an aqueous caustic soda solution and an aqueous calcium chloride solution; b) performing crystallization by slowly adding the aqueous calcium chloride solution to the aqueous caustic soda solution under room temperature and room pressure and at the same time blowing $CO_2$ gas thereinto, to crystallize into calcite; and c) obtaining high-purity single-phase calcite by separating solid and liquid from each other in a slurry crystallized in Step b) and drying the solid.

In Step a), calcium chloride and caustic soda are general kinds of reagents, which are accessible on the market. However, they are not limited thereto, and industrial byproducts may be used therefor, or they may be intermediate products generated during a procedure of increasing the purity of limestone.

In Step a), it is preferable to prepare the aqueous caustic soda solution of 1N or more, and more specifically, 1 to 10N, and the aqueous calcium chloride solution of 1 to 10M, and more specifically, about 1 to 5M considering the concentration of slurry, which needs to be in a stoichiometric composition.

In Step b), the temperature at the time of reaction is room temperature, and more specifically, the reaction is performed at 15 to 25° C., but heating is not needed. The mixing is preferably performed by stirring, but is not limited thereto.

In Step b), since the calcite is formed through an exothermic reaction, an ending point of the reaction is mostly identical to a time point at which heat generation is stopped. Therefore, in the case of reaction in a 1-liter container, an increase in temperature is about 10 to 20° C.

In Step b), a mixing ratio of the two aqueous solutions is defined by a stoichiometric ratio. For example, 250 cc of 1M the aqueous calcium chloride solution is preferably inputted for 300 cc of 1.7N the aqueous caustic soda solution, and 250 cc of 1.75M the aqueous calcium chloride solution for 300 cc of 3.5N the aqueous caustic soda solution.

In Step b), the input flow amount of $CO_2$ gas is preferably 0.3 to 5 L/min, and more preferably, 0.5 to 2.0 L/min. Too much input flow amount or too less input flow amount of $CO_2$ gas results in rather decreased efficiency. A ratio of the input flow amount of $CO_2$ gas to the amount of conversion into calcite leads to efficiency of about 85% at about 1.5 to 1.0 L/min, which is more preferable.

In Step b), a pH of the reaction solution is about 14 to 12 for high alkaline solution (for example, 5 to 7N of caustic soda), and about 14 to 7 for low alkaline solution (for example, 1.7 to 2.5 N of caustic soda).

In Step b), as the alkalinity of the reaction solution becomes larger, the calcite crystallizes to have a smaller grain size. For example, calcite having a grain size of 50 to 100 nm is obtained for a 5N aqueous caustic soda solution, and calcite having a grain size of about 1 to 2 μm is obtained for the low alkaline solution, for example, a 1.7N aqueous caustic soda solution.

The reaction in step b) may be expressed by Equation 4 below.

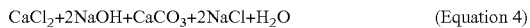

$$CaCl_2 + 2NaOH + CaCO_3 + 2NaCl + H_2O \quad \text{(Equation 4)}$$

In Step b), the calcite may be obtained in a slurry state.

In Step c), solid and liquid are separated from each other in the slurry state of calcite, and then dried at 50 to 100° C., thereby obtaining single phase calcite.

It is convenient to employ a centrifugal separator, a press filter, or the like, as a separating unit, but the separating unit is not limited thereto. Any method that can separate solid and liquid from each other may be used. Here, the calcite obtained after drying the solid has purity of 99% or more, and hereby, high-purity, ultra-fine grain, and single-phase calcite can be obtained. A powder of the obtained calcite can be confirmed through instrumental analysis such as X-ray diffraction analysis, chemical analysis, or the like.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be in detail described by examples, but the present invention is not limited to the following examples.

Whiteness is the most important physical property of a calcite powder. Whiteness of calcite was measured by using a whiteness meter (Whiteness tester, C100-3, Kett electric laboratory, Japan), and here $Al_2O_3$ was employed as a standard specimen. Besides, characteristics of calcite were analyzed by using TGA and XRD.

Example 1

While 400 cc of 1N aqueous NaOH solution was continuously stirred at room temperature, 300 cc of 2M aqueous calcium chloride ($CaCl_2$) solution was slowly inputted thereinto at a rate of, specifically, about 20 cc/min, followed by reaction with $CO_2$ gas, thereby preparing a calcite slurry. An input flow rate of $CO_2$ gas was 1.5 L/min, and at the same time when of $CO_2$ gas was inputted, calcite crystallized. A pH of the aqueous reaction solution exhibited 14 at the initial time and about 8.2 after completion of the reaction.

Figure 4:
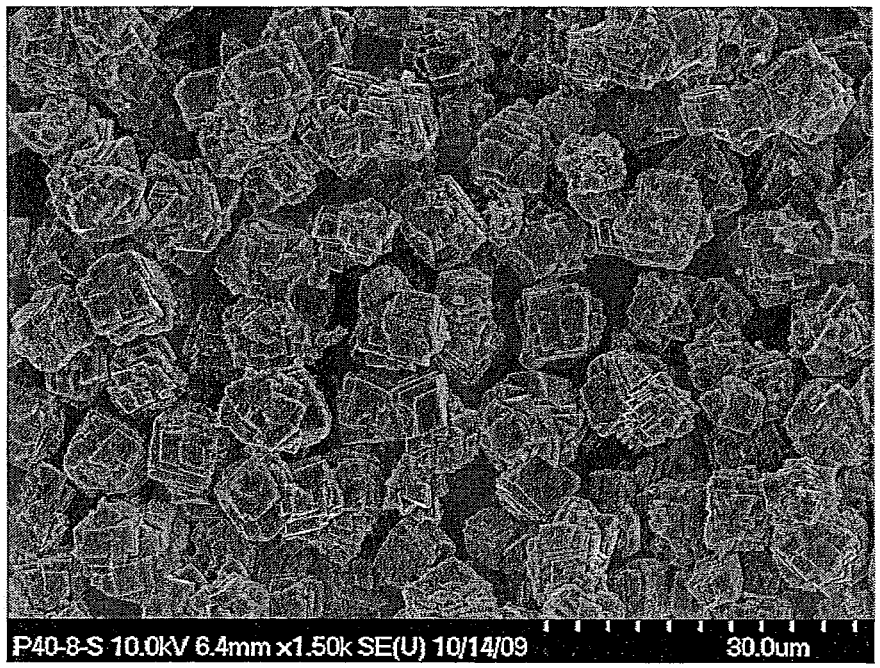
FIG. 4 is an electron microscopic image of calcite produced by Example 1.

After finishing the reaction, centrifugal separation was carried out at a rate of 1000 rpm for 10 minutes by using a laboratory centrifugal separator (Union32R, Hanil), and then solid-phase calcite was dried to obtain 51 g of a powder. Here, a grain size thereof was about 7 to 10 μm and whiteness thereof was 99.8 under the electron microscope (FIG. 4).

Figure 1:
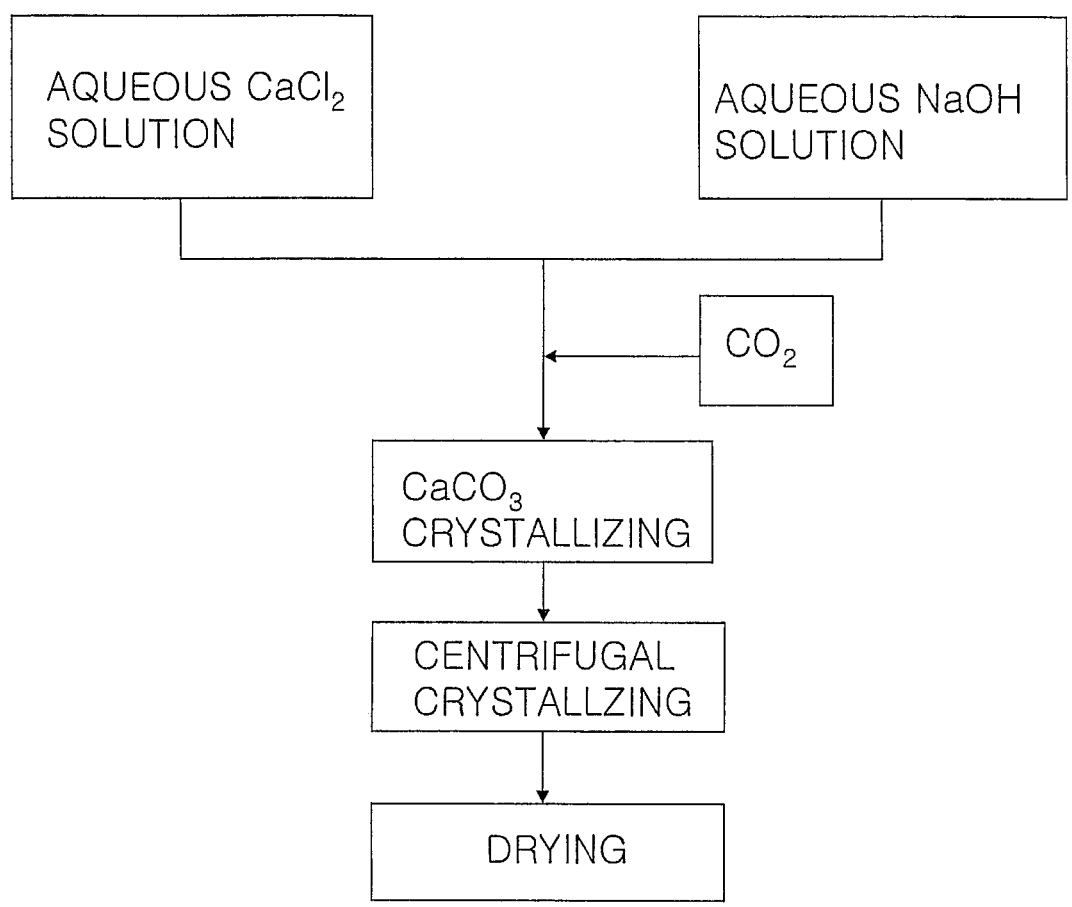
FIG. 1 is a process flow chart simply showing a method of controlling a grain size of calcite according to the present invention.
Figure 2:
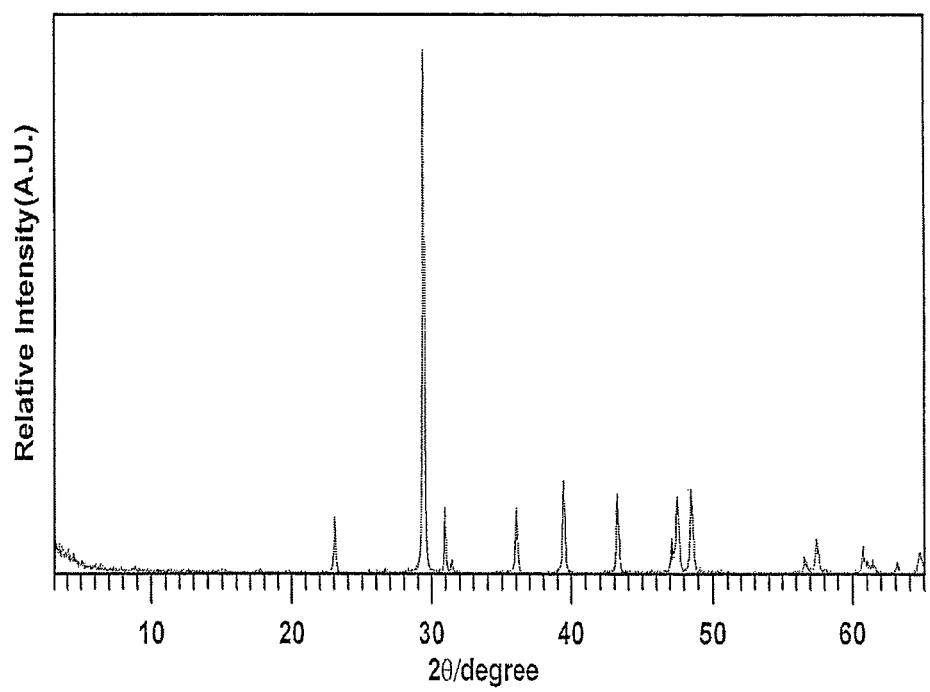
FIG. 2 is an image showing X-ray diffraction analysis results of calcite produced by Examples 1, 2, and 3.
Figure 3:
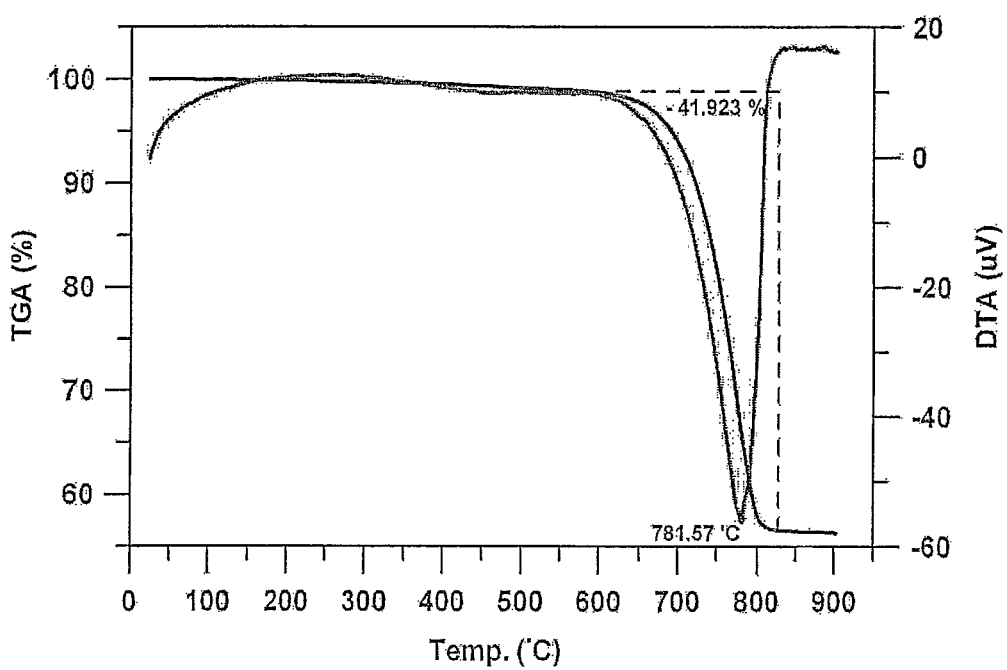
FIG. 3 is an image showing heat analysis results of calcite produced by Examples 1, 2, and 3.

As a result of X-ray diffraction analysis of the calcite, the calcite exhibited d=3.03 A (104), 2.285 A (113), 2.09 A (202), which confirmed that single-phase calcite was produced (FIG. 2). Also, as a result of heat analysis of the calcite, the number of melting points was one and there was no thermal reaction, which confirmed that single-phase calcite was produced (FIG. 3). The composition ratio of the above example is shown in Table 1 below.

Example 2

While 400 cc of 2.5N aqueous NaOH solution was continuously stirred at room temperature, 250 cc of 2M aqueous calcium chloride ($CaCl_2$) solution was slowly inputted thereinto at a rate of, specifically, about 14 cc/min, followed by reaction with $CO_2$ gas, thereby preparing a calcite slurry. An input flow rate of $CO_2$ gas was 1.5 L/min, and at the same time when $CO_2$ gas was inputted, calcite crystallized. A pH of the aqueous reaction solution exhibited 14 at the initial time and about 9.1 after completion of the reaction.

Figure 5:
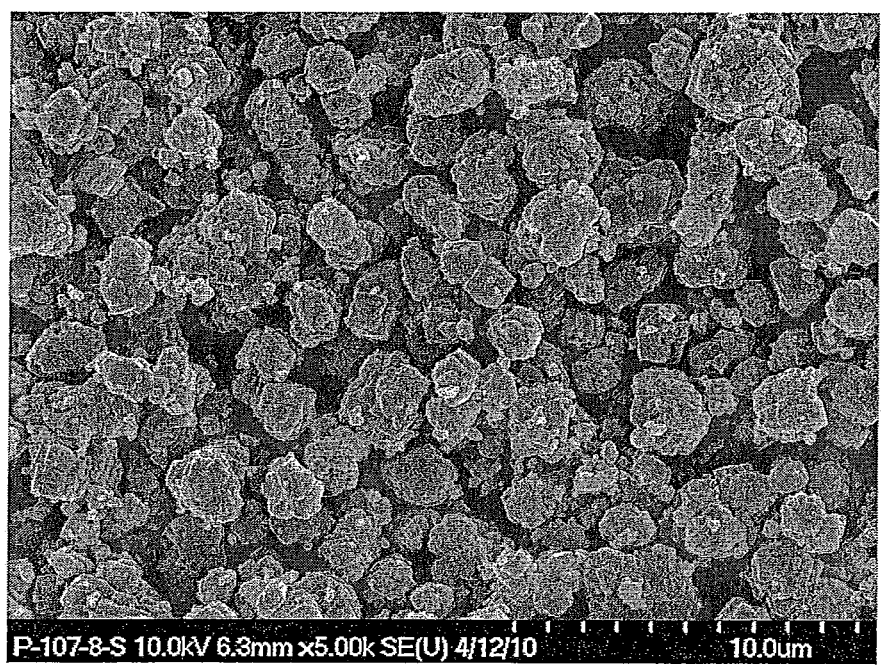
FIG. 5 is an electron microscopic image of calcite produced by Example 2.

After finishing the reaction, centrifugal separation was carried out at a rate of 1000 rpm for 10 minutes by using a laboratory centrifugal separator (Union32R, Hanil), and then solid-phase calcite was dried to obtain 49 g of a powder. Here, a grain size thereof was about 1 to 2 μm and whiteness thereof was 99.6 under the electron microscope (FIG. 5).

As a result of X-ray diffraction analysis of the calcite, the calcite exhibited d=3.03 A (104), 2.285 A (113), 2.09 A (202), which confirmed that single-phase calcite was produced (FIG. 2). Also, as a result of heat analysis of the calcite, the number of melting points was one and there was no thermal reaction, which confirmed that single-phase calcite was produced (FIG. 3). The composition ratio of the above example was shown in Table 1 below.

Example 3

While 300 cc of 5N aqueous NaOH solution was continuously stirred at room temperature, 205 cc of 2M aqueous calcium chloride ($CaCl_2$) solution was slowly inputted thereinto at a rate of, specifically, about 14 cc/min, followed by reaction with $CO_2$ gas, thereby preparing a calcite slurry. Here, colloidal type ultra-fine grain calcite was formed and gelled. An input flow rate of $CO_2$ gas was 1.5 L/min, and at the same time when $CO_2$ gas was inputted, calcite crystallized. A pH of the aqueous reaction solution exhibited 14 at the initial time and about 12.5 after completion of the reaction.

Figure 6:
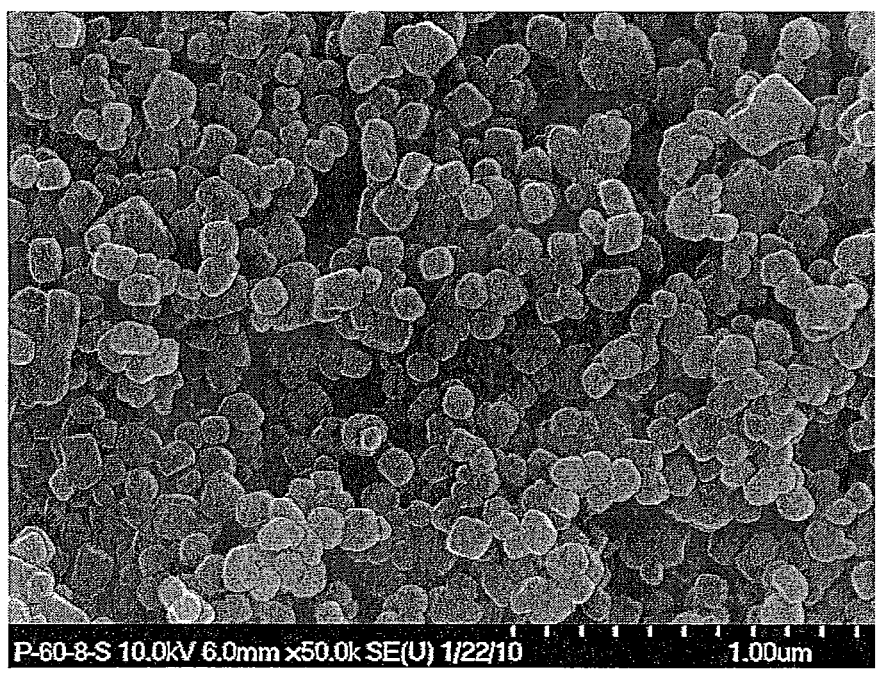
FIG. 6 is an electron microscopic image of calcite produced by Example 3.

After finishing the reaction, centrifugal separation was carried out at a rate of 1000 rpm for 10 minutes by using a laboratory centrifugal separator (Union32R, Hanil), and then solid-phase calcite was dried to obtain 40 g of a powder. Here, a grain size thereof was about 200 to 100 nm and whiteness thereof was 101 under the electron microscope (FIG. 6).

As a result of X-ray diffraction analysis of the calcite, the calcite exhibited d=3.03 A (104), 2.285 A (113), 2.09 A (202), which confirmed that single-phase calcite was produced (FIG. 2). Also, as a result of heat analysis of the calcite, the number of melting points was one and there was no thermal reaction, which confirmed that single-phase calcite was produced (FIG. 3).

The composition ratio of the above example was shown in Table 1 below.

TABLE 1

| | Concentration of aqueous NaOH solution (mol) | Amount of aqueous NaOH solution (cc) | Change in pH | Concentration of aqueous $CaCl_2$ solution (mol) | Amount of aqueous $CaCl_2$ solution (cc) | Weight of calcite (g) | Whiteness | Grain size (μm) |
|---|---|---|---|---|---|---|---|---|
| Example 1 | 1 | 400 | 14~8 | 2 | 300 | 51 | 100 | 7~10 |
| Example 2 | 2.5 | 400 | 14~9 | 2 | 250 | 49 | 99 | 1~2 |
| Example 3 | 5 | 300 | 14~12.5 | 2 | 205 | 40 | 101 | 0.2~0.1 |

It was seen that the calcite produced according to the method of the present invention was single phase calcite, and it was confirmed from the above table that the grain size of calcite was controllable to several nanometers to several micrometers by adjusting the concentration of the aqueous caustic soda solution and the content of the aqueous calcium chloride solution. Also, it was seen that whiteness of the produced calcite was 99 or more, which is excellent.

The grain size and the whiteness are the largest factors determining the usage and the added value of calcite. Between the two, the grain size is the most important factor. When the strong alkaline solvent is used to control the grain size of calcite according to the synthesizing method of the present invention, ultra-fine grain calcite can be easily produced. Here, high purity and high whiteness calcite can be produced by adjusting purity of caustic soda and calcium chloride which are the starting materials, and resultantly, all the grain size, purity, and whiteness of calcite can be controlled.

In particular, according to this method, calcite produced by mineral carbonation from phosphor-gypsum and fuel-gas desulfurization gypsum is recycled for industrial usage, thereby increasing the added value. Further, low-grade natural limestone also is treated as above to produce ultra-fine grain calcite, thereby increasing the utility of resources as well as protecting environment and recycling waste resources.

What is claimed is:

1. A method of producing calcite comprising:
mixing an aqueous calcium chloride solution and an aqueous caustic soda solution to form a mixture; and
simultaneously reacting the mixture while $CO_2$ gas is flown thereinto, under room temperature and room pressure, to crystallize into high-purity single-phase calcite, wherein the molar ratio of the caustic soda of the aqueous caustic soda solution to the calcium chloride of the aqueous calcium chloride solution is from (2/3):1 to (150/41):1 to produce calcite, and a grain size of the calcite is controlled to less than 200 nm by using an aqueous caustic soda solution of 5N or more.

2. The method of claim 1, further comprising:
a) preparing source materials by preparing an aqueous caustic soda solution and an aqueous calcium chloride solution;
b) performing crystallization by slowly adding the aqueous calcium chloride solution to the aqueous caustic soda solution under room temperature and room pressure and at the same time blowing $CO_2$ gas thereinto, to crystallize into calcite; and
c) obtaining high-purity single-phase calcite by separating solid and liquid from each other in a slurry crystallized in Step b), and drying the solid.

3. The method of claim 2, wherein an input amount of $CO_2$ gas is 0.3 to 5 L/min.

4. The method of claim 1, wherein an input amount of $CO_2$ gas is 0.3 to 5 L/min.

* * * * *